United States Patent
Kaeb et al.

(10) Patent No.: US 9,630,779 B2
(45) Date of Patent: Apr. 25, 2017

(54) CLEATED BELT CONVEYOR

(71) Applicant: KSi Conveyor, Inc, Cissna Park, IL (US)

(72) Inventors: Paul A. Kaeb, Sabetha, KS (US); Steven R. Walden, Hoopeston, IL (US)

(73) Assignee: KSi Conveyor, Inc., Sabetha, KS (US)

( * ) Notice: Subject to any disclaimer, the term of this patent is extended or adjusted under 35 U.S.C. 154(b) by 0 days.

(21) Appl. No.: 15/074,308

(22) Filed: Mar. 18, 2016

(65) Prior Publication Data

US 2016/0272427 A1    Sep. 22, 2016

Related U.S. Application Data

(60) Provisional application No. 62/134,897, filed on Mar. 18, 2015.

(51) Int. Cl.
| | | |
|---|---|---|
| *B65G 15/44* | (2006.01) | |
| *B65G 15/42* | (2006.01) | |
| *B65G 15/08* | (2006.01) | |
| *B65G 19/14* | (2006.01) | |

(52) U.S. Cl.
CPC ........... *B65G 15/44* (2013.01); *B65G 15/08* (2013.01); *B65G 15/42* (2013.01); *B65G 19/14* (2013.01)

(58) Field of Classification Search
CPC ................................ B65G 15/44; B65G 15/08
See application file for complete search history.

(56) References Cited

U.S. PATENT DOCUMENTS

| | | | | |
|---|---|---|---|---|
| 2,264,332 A * | 12/1941 | Peterson | ............ | B65G 15/08 198/713 |
| 6,170,646 B1 * | 1/2001 | Kaeb | ............ | B65G 15/08 198/819 |
| 6,360,878 B1 * | 3/2002 | Deal | ............ | B65G 15/08 198/311 |
| 6,405,855 B1 * | 6/2002 | Peltier | ............ | B65G 15/08 198/819 |
| 7,000,758 B2 * | 2/2006 | Bjorklund | ............ | B65G 15/08 198/716 |
| 9,181,033 B2 * | 11/2015 | Stenson | ............ | B65G 19/14 |
| 9,221,616 B2 * | 12/2015 | Klassen | ............ | B65G 15/42 |
| 9,254,963 B2 * | 2/2016 | Schroeder | ............ | B65G 15/08 |
| 2002/0139643 A1 * | 10/2002 | Peltier | ............ | B65G 15/08 198/821 |
| 2008/0173521 A1 * | 7/2008 | Hitch | ............ | B65G 15/42 198/698 |
| 2010/0326798 A1 * | 12/2010 | Friesen | ............ | B65G 15/08 198/823 |

* cited by examiner

*Primary Examiner* — Thomas Randazzo
(74) *Attorney, Agent, or Firm* — Coughlin Law Office; Daniel J. Coughlin

(57) ABSTRACT

An improved conveyor belt is disclosed for conveying granular material through a curvilinear structure at operating incline angles of at least 30 degrees. The belt has a first surface, a longitudinal axis, a transverse axis, and a plurality of cleat members extending from the first surface of the belt. The cleat members are arranged to cooperate together to form a plurality of longitudinally spaced-apart cleat walls during movement of the conveyor belt through the curvilinear structure. In this way, the cleat wall supports at least a portion of the granular material during movement of the conveyor belt through the curvilinear structure. The longitudinal space between subsequent cleat walls is between 4.5 inches and 5.5 inches.

18 Claims, 2 Drawing Sheets

CLEATED BELT CONVEYOR

CROSS-REFERENCE TO RELATED APPLICATION

This application claims the benefit of U.S. Provisional Application No. 62/134,897, filed 18 Mar. 2015.

FIELD OF INVENTION

The present invention relates to conveyor belts and, more particularly, to improvement on conveyor belts having cleats that are adaptable to curvilinear shapes upon the conveyor belt entering into and moving through curvilinear structures.

BACKGROUND

Conveyor transported materials—specifically particulates or granular material, such as seed or grain—are best moved by a conveyor equipped with a cleated belt. Cleated belt conveyors are an effective solution for transporting materials through an incline. The cleats members are affixed at predetermined locations on the belt. The cleat members can have notched edges forming gaps between individual cleat members. As the flat conveyor belt is directed through a curvilinear structure—such as a tube—both the conveyor belt and cleats adapt to the shape of the curvilinear structure. The arrangement and shape of the cleat members cause the individual cleat members to form a cleat wall, thereby, preventing materials from sliding on the conveyor belt during movement of the conveyor belt through the structure.

In certain applications there is a need for improved material conveyance rates. In the agricultural applications, there is only a narrow window for planting or harvesting. The operator requires that grain from a wagon or truck be transferred as quickly as possible. However, additional damage to the grain can be caused by increasing the belt speed and increasing the diameter of the tube decreases the portability of the conveyor system as well as increases the cost to manufacture the conveyor system. This requirement has proved especially challenging when transferring particulate or granular matter at angles greater than 30 degrees. For the foregoing reasons, there is a need for a conveyor belt that can transfer material at increased conveyance rates, without increasing the belt speed.

SUMMARY

The present innovation is directed to an apparatus and method of use that increases the capacity of the cleated belt conveyor and the conveyance rate without requiring an increase in belt speed. Existing cleated belt conveyors generally use a 6-9" longitudinal spacing between cleat rows. For example, U.S. patent application Ser. No. 12/757,618 discloses spacing between cleat rows of at least 6 inches and preferably 9 inches. Another example is U.S. Pat. No. 9,254,963, which discloses a broad range of longitudinal cleat row spacing between 2 inches and 24 inches.

We have demonstrated that there are substantial differences in capacity and transfer rates for conveyor belts with cleat rows longitudinally spaced apart over this broad range. Specifically, we recognized that for conveyor systems that operate at angles between a 30 degree and 45 degree incline, a conveyor belt with cleat rows with longitudinal spacing between cleat rows of 5" increases conveyor transfer rate up to 21% relative to a belt with longitudinal spacing between cleat rows of 6". We also demonstrate that the static material capacity of a belt with 5" longitudinal cleat row spacing exceeds both the 6" and the 7" longitudinal cleat row spacing. We also demonstrate that the increased rates are observed even when the conveyor system is operated at lower belt speeds.

The present innovation is directed to a conveyor belt for a conveyor system that has a curvilinear structure for conveying granular material at an operating angle at least 30 degrees. The belt has a first surface, a longitudinal axis, a transverse axis, and a plurality of cleat members extending from the first surface of the belt. The cleat members are arranged to cooperate together to form a plurality of longitudinally spaced-apart cleat walls during movement of the conveyor belt through the curvilinear structure. In this way, the cleat wall supports at least a portion of the granular material during movement of the conveyor belt through the curvilinear structure. The longitudinal space between subsequent cleat walls is between 4.5 inches and 5.5 inches. The conveyor system is configured to operate at an angle of at least 30 degrees.

The present innovation is also directed toward a belt for a tube conveyor system for conveying grains and other particulate materials at an operating angle between 30 degrees and 45 degrees. The endless belt has an outer surface, a longitudinal axis, a transverse axis, and a plurality of longitudinally spaced-apart cleat rows. Each cleat row has a plurality of cleat members extending from the outer surface of the belt and along the transverse axis of the belt. The longitudinal space between cleat rows is between 4.5 inches to 5.5 inches. The conveyor system is configured to operate at an angle between 30 degrees and 45 degrees.

The present innovation is also directed toward a method of using a belt conveyor in a tube conveyor system operating at angles of at least 30 degrees to convey granular material. The method comprises providing a conveyor belt that comprises a plurality of longitudinally spaced-apart cleat rows. The cleat rows have a plurality of cleat members that extend from an outer surface of the conveyor belt and along a transverse axis of the conveyor belt. The longitudinal distance between subsequent cleat rows is between 4.5 inches and 5.5 inches. The tube conveyor system is operated at an angle of at least 30 degrees to convey granular material.

Advantages of this innovation include:
a) Increased material conveyance rate decreases material transfer time;
b) Increased static capacity for material; and
c) Decreased belt speed requirements, which is gentler on the material being transferred.

DRAWINGS

Aspects of the current disclosure are illustrated by way of example, and not by way of limitation, in the accompanying drawings, wherein.

DESCRIPTION

In the Summary above, the Detailed Description, and in the accompanying drawings, reference is made to particular features elements of the invention. The reader should understand that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and its grammatical equivalents are used in this document to mean that other components, steps, etc. are optionally present. For example, an article "comprising" or "which comprises" components A, B, and C can consist of components A, B, and C, or can contain not only components A, B, and C but also one or more other components.

The term "at least" followed by a number is used to denote the start of a range beginning with that number (which may be a range having an upper limit or no upper limit, depending on the variable being defined). For example, "at least 1" means 1 or more than 1. In this specification, when a range is given as "(a first number) to (a second number)," this means a range whose lower limit is the first number and whose upper limit is the second number. For example, 30 degrees to 45 degrees means a range whose lower limit is 30 degrees and whose upper limit is 45 degrees.

Figure 1:
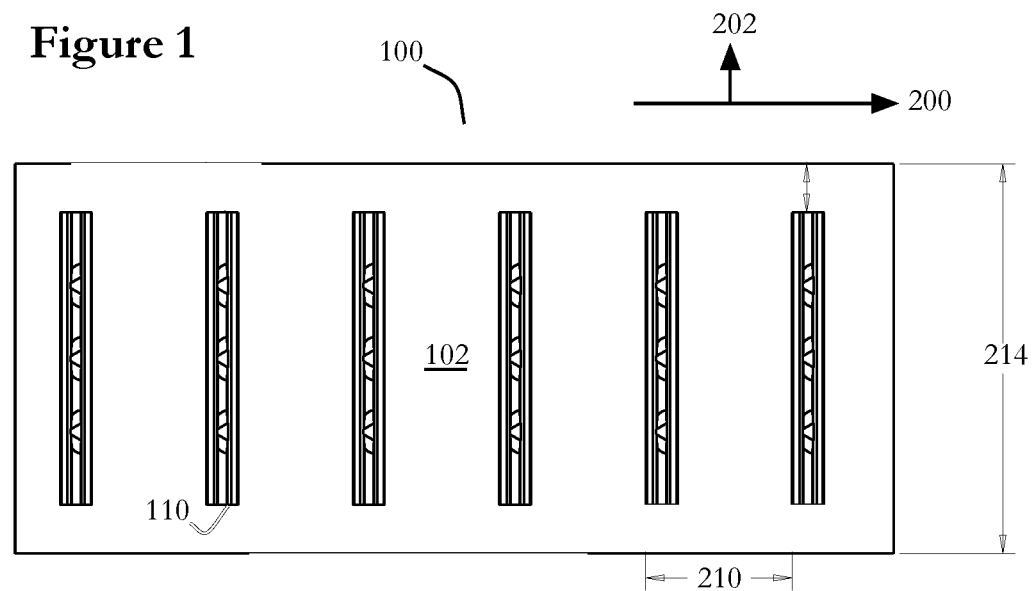
FIG. 1 is a top perspective view of a cleated conveyor belt portion.
Figure 2:
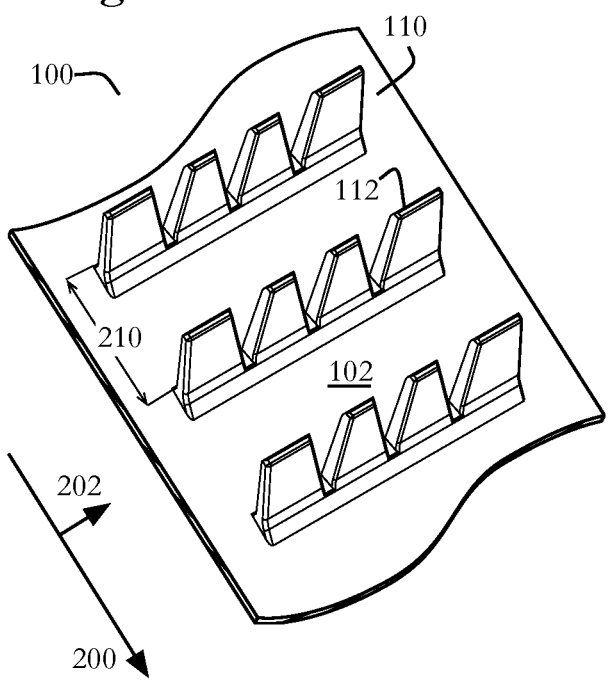
FIG. 2 is a top side perspective view of a cleated conveyor belt portion.
Figure 3:
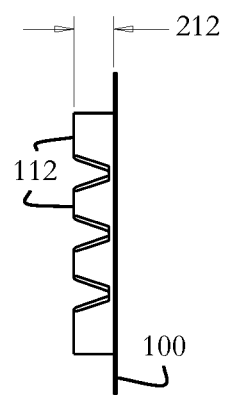
FIG. 3 is a side perspective view showing the cleat members arranged in the flat configuration.

As shown in FIG. 1, a conveyor belt 100 comprises a first surface 102, a longitudinal axis 200, a transverse axis 202, and a plurality of cleat members 112. The conveyor belt 100 is rotated around guide rollers (not shown). The conveyor belt enters into a curvilinear structure—such as a tube or cylinder—at an entrance and exits the curvilinear structure at an exit. At the entrance, the belt conforms to the curvilinear structure.

The plurality of cleat members 112 extend from the first surface 102 of the belt 100. In one embodiment, the cleats extend generally perpendicularly from the conveyor belt and have a cleat height 212. The cleat height 212 is preferably set at a height suitable to prevent materials from back sliding on conveyor belt and to fit within the tube and the return housing. In one embodiment, the cleat height 212 is 2 inches.

The cleat members 112 are arranged to cooperate together to form a plurality of longitudinally spaced-apart cleat walls 110 during movement of the conveyor belt through the curvilinear structure thereby supporting at least a portion of the granular material. As the conveyor belt 100 continues to operate, the belt is moved completely through the curvilinear structure to the exit where the materials are deposited into a truck, silo, box, another conveyor belt, or other deposit receptacle.

In one embodiment, the cleat members 112 are arranged in rows along the transverse axis of the conveyor belt 100. The rows are longitudinally spaced apart along the length of the conveyor belt 100.

The conveyor belt is particularly suited to transport granular and particulate materials including, but not limited to: corn, seeds, soybeans, ash, fertilizer and foundry dust.

The conveyor can be operated at a variety of angles relative to the ground. The appropriate angle is determined by the specific use of the conveyor and the position of the source and destination of the material. Some applications require the conveyor to be operated at least 30 degree incline relative to the ground. Other applications the conveyor is operated at angles including a 30 degree to 45 degree incline. In still other applications, such as in a seed wagon, the conveyor is operated between a 40 degree and 45 degree incline relative to the ground. Seed wagons are portable, and therefore short and steep conveyors are generally preferred.

Figure 4:
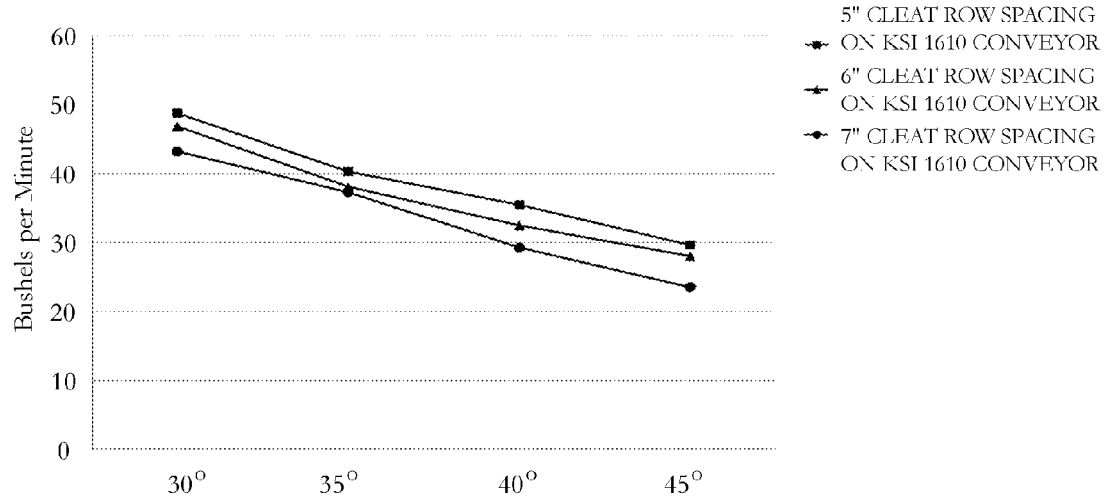
FIG. 4 is a graph showing the calculated conveyance rate based on static capacity of cleated conveyor belts having 5 inch, 6 inch, and 7 inch longitudinal spacing.
Figure 5:
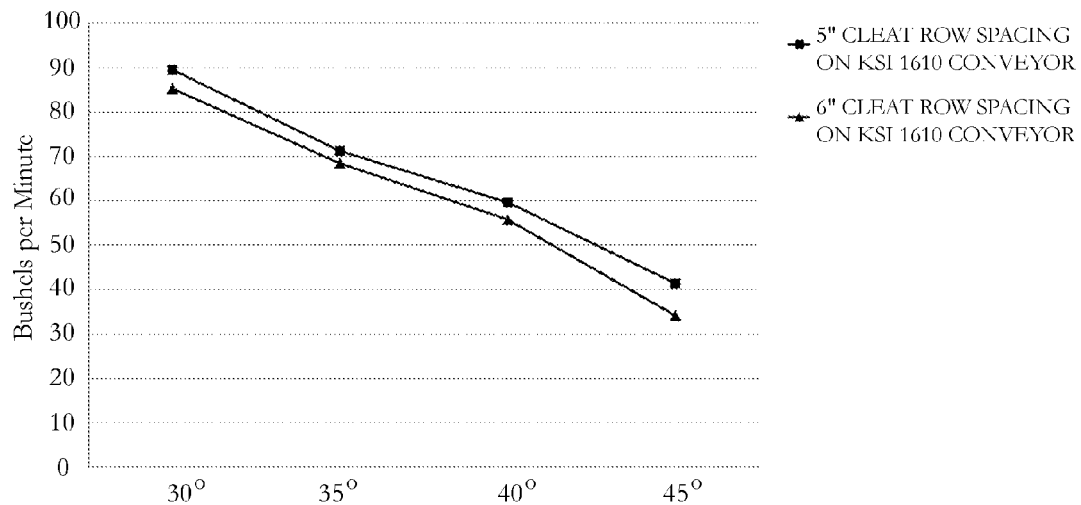
FIG. 5 is a graph showing the measured conveyance rate of cleated conveyor belts having 5 inch and 6 inch longitudinal spacing.

As shown in FIGS. 4 and 5 and tests 1-4 below, different portions of the broad range of possible longitudinal spacing between cleat rows 110 result in substantially different material transfer rates.

We performed test 1 to compare the 5" longitudinal spacing and the standard 6" longitudinal spacing under the following conditions:

Tractor: John Deere 8100
Edaq lite with transducers at the hydraulic motor
Conveyor Angle: 40 Degree Incline
Product: 9,600 lbs of wheat in hopper bottom wagon
Eaton 2000 series 8.0 cu/in hydraulic motor
Conveyor belt with 5" cleat spacing
¾" Hydraulic Hose The results from Test 1 with without product are shown in the table below:

|  | Average Operating Pressure | Average Return Pressure | Max Operating Pressure | Max Return Pressure | Belt Speed |
| --- | --- | --- | --- | --- | --- |
| 5" longitudinal spacing | 1,350 PSI | 625 PSI | 1,500 PSI | 700 PSI | 700 FPM |
| 6" longitudinal spacing | 1,200 PSI | 575 PSI | 1,300 PSI | 675 PSI | 700 FPM |

We performed Test 2 under the same conditions, with the following grain product:

Product: Wheat
Weight: 9,600 lbs
Bushel weight: 60 bu/lb

The results from Test 2 with product are shown in the table below:

|  | Average Operating Pressure | Average Return Pressure | Max Operating Pressure | Max Return Pressure | Belt Speed | Time to Transfer 9,600 lbs | Transfer Rate |
| --- | --- | --- | --- | --- | --- | --- | --- |
| 5" longitudinal spacing | 1,600 PSI | 600 PSI | 1,800 PSI | 700 PSI | 623 FPM | 2:23 | 67 bu/min |
| 6" longitudinal spacing | 1,587 PSI | 575 PSI | 1,800 PSI | 675 PSI | 700 FPM | 2:38 | 60.75 bu/min |

The cleated belt with the 5" longitudinal spacing between cleat row shows a substantial increase in Transfer Rate (approximately 10% increase) even at lower belt speeds. Increasing the belt speed to 700 FPM could show even greater increases in Transfer Rate by the 5" spaced cleats over the 6" spaced cleats.

We performed Test 3 using a cleated belt in section of 10" tube and tested a 30" length of cleated conveyor belt 100. For testing we used an adjustable stand that would hold the tube at various incline angles and dumped wheat onto the tube with the cleated conveyor belt in the tube until the wheat ran out the lower end. The weight was recorded of the wheat retained in the section was recorded. We then determined a Calculated Rate based on standard belt speed rates.

| Calculated Rate Based On Static Capacity Measurement at Varying Operating Angles (Bushels per Minute) | | | | | |
|---|---|---|---|---|---|
| | 30° | 35° | 40° | 45° | Average |
| 5" Cleat Row Spacing | 48.8 | 40.3 | 35.5 | 29.6 | 38.6 |
| 6" Cleat Row Spacing | 46.9 | 38.1 | 32.5 | 28 | 36.4 |
| 7" Cleat Row Spacing | 43.2 | 37.3 | 29.3 | 23.5 | 33.3 |

The table below shows the percent increase of the 5" longitudinal spacing relative to the belts with 6 inch and 7 inch longitudinal spacing between cleat rows 110.

| Calculated Rate Increase of 5" Longitudinal Spacing between Subsequent Cleat Row at Varying Operating Angles Based On Static Capacity Measurement (Bushels per Minute) | | | | | |
|---|---|---|---|---|---|
| | 30° | 35° | 40° | 45° | Average |
| 5" Rate Gain Over 6" Spacing | 4% | 6% | 9% | 6% | 6% |
| 5" Rate Gain Over 7" Spacing | 13% | 8% | 21% | 26% | 17% |

We performed Test 3 using a KSi Conveyors, Inc. 1610 Conveyor, which uses a 16 inch wide cleated conveyor belt with a 10 inch tube. The cleat row has a transverse width of 12 inches. The cleats members are 2 inches tall. The discharged product was received in a weigh hopper to generate a conveyance rate.

| Measured Rates Comparing Longitudinal Spacing of Subsequent Cleat Rows at Varying Operating Angles (Bushels Per Minute) | | | | | |
|---|---|---|---|---|---|
| | 30° | 35° | 40° | 45° | Average |
| 6" Spacing | 85.2 | 68.4 | 55.7 | 34.1 | 60.9 |
| 5" Spacing | 89.5 | 71.2 | 59.6 | 41.4 | 65.4 |

The table below shows the percent increase of the 5" longitudinal spacing relative to the belts with 6 inch longitudinal spacing between cleat rows 110 as determined by Test 4.

| Measured Rates Increase of 5" Longitudinal Spacing of Subsequent Cleat Rows Over 6" Spacing at Varying Operating Angles (Bushels Per Minute) | | | | | |
|---|---|---|---|---|---|
| | 30° | 35° | 40° | 45° | Average |
| Rate Improvement of 5" Spacing Over 6" Spacing | 5% | 4% | 7% | 21% | 7% |

When the cleat row enters the tube and forms the solid cleat wall, the aggregated seed forms a seed pocket that is supported by the belt and the cleat wall. As the angle of the conveyor increased, the seed pocket changes shape. 4" longitudinal spacing between cleat rows 100 on the cleated conveyor belt 100 was also tested, but the results are not included in this disclosure as the conveyance rate was poorer than the belt with the 5 inch spacing between a 30 degree and 40 degree incline. The steeper the conveyor angle requires a closer longitudinal spacing between cleat rows to maintain capacity or increase transfer rates relative to lower conveyor angles.

Additionally, the cleats can be pitched forward to increase the depth of the seed pocket when the conveyor is used at higher degrees of incline. The forward pitched cleat can be used with the 5" longitudinal spacing or with standard cleat spacing. For example, the cleat can be pitched forward 40° to approximate the incline of a conveyor operating at 40°-45°. In this way, the cleat is generally perpendicular to the ground while traveling up the incline conveyor.

The forward pitched cleat is advantageous because the forward-pitched cleat can be longer than the standard cleat that is perpendicular to the belt without affecting the overall height of the cleat relative to the belt. For example, a 2.474" cleat that is pitched forward 40° has a height relative to the belt surface of 2.203". This is advantageous because existing cleated belt incline conveyors utilize a rectangular return box. It is advantageous for the height of the cleat relative to the belt to accommodate the size of existing return boxes.

When the cleat row enters the tube and forms the solid cleat wall, the aggregated seed forms a seed pocket that is supported by the belt and the cleat wall. As the angle of the conveyor increased, the seed pocket changes shape. At high conveyor angles—greater than a 20° pitch and preferably a 40°-45° pitch between the conveyor and the ground—the existing 2" perpendicular cleat wall forms a horizontally wide but vertically shallow seed pocket. The 40° forward pitched 2.474" long cleat forms a larger seed pocket, that is vertically deeper than the seed pocket formed by the 2" perpendicular clear wall. The larger seed pocket results in increased seed pocket capacity and results in increase transfer rates relative to the 2" perpendicular cleat, while maintaining a vertical belt clearance of 2.2". The vertical belt clearance is the distance measured from the belt to the top of the belt cleat, at an angle perpendicular to the belt.

We claim:
1. A conveyor belt for a conveyor system having a curvilinear structure for conveying granular material at an operating angle at least a 30 degree incline, the belt comprising:
   a. a first surface;
   b. a longitudinal axis;
   c. a transverse axis;
   d. a plurality of cleat members extending from the first surface of the belt, the cleat members being arranged to cooperate together to form a plurality of longitudinally spaced-apart cleat walls during movement of the conveyor belt through the curvilinear structure thereby supporting at least a portion of the granular material;
   e. wherein the longitudinal space between subsequent cleat walls is between 4.5 inches and 5.5 inches; and
   f. wherein the conveyor system is configured to operate at an angle of at least a 30 degree incline.
2. The conveyor belt of claim 1, wherein the longitudinal space between subsequent cleat walls is 5 inches.

3. The conveyor belt of claim 2, wherein the conveyor system is configured to operate at an angle between a 30 degree and 45 degree incline.

4. The conveyor belt of claim 1, wherein at least two cleat members in each cleat wall are interconnected.

5. The conveyor belt of claim 1, wherein the cleat members of each cleat wall extend from first surface of the belt along the transverse axis of the belt.

6. The conveyor belt of claim 5, wherein the conveyor system is configured to operate at an angle between a 30 degree and 45 degree incline.

7. The conveyor belt of claim 6, wherein the longitudinal space between subsequent cleat walls is 5 inches.

8. A belt for a tube conveyor system for conveying grains and other particulate materials at an operating angle between a 30 degree and 45 degree incline, the belt comprising:
   a. an endless belt having an outer surface, a longitudinal axis, a transverse axis;
   b. a plurality of longitudinally spaced-apart cleat rows, each cleat row having a plurality of cleat members extending from the outer surface of the belt and along the transverse axis of the belt;
   c. wherein the longitudinal space between cleat rows is between 4.5 inches to 5.5 inches;
   d. wherein the conveyor system is configured to operate at an angle between a 30 degree and 45 degree incline.

9. The conveyor belt of claim 8, wherein the longitudinal space between subsequent cleat rows is 5 inches.

10. The conveyor belt of claim 9, wherein the cleat members having a height of at least 2 inches.

11. The conveyor belt of claim 8, wherein the cleat members in each row are interconnected.

12. The conveyor belt of claim 8, wherein the conveyor system is configured to operate at an incline angle of 45 degrees and the longitudinal space between subsequent cleat rows is 5 inches.

13. The conveyor belt of claim 8, wherein the belt has a width between 14 inches to 18 inches; the cleat row has a width of between 10 inches to 14 inches; at least one cleat member has a height of at least 2 inches; and the conveyor system is configured with a 10 inch tube to deliver at least 40 bushel per minute of grain at an operating incline angle of 45 degrees.

14. The conveyor belt of claim 13, wherein the longitudinal space between subsequent cleat rows is 5 inches.

15. A method of increasing the conveyance rate of a belt conveyor in a tube conveyor system operating at angles of at least a 30 degree incline to convey granular material, the method comprising:
   a. providing a conveyor belt that comprises a plurality of longitudinally spaced-apart cleat rows, wherein the cleat rows have a plurality of cleat members that extend from an outer surface of the conveyor belt and along a transverse axis of the conveyor belt, wherein the longitudinal distance between subsequent cleat rows is between 4.5 inches and 5.5 inches; and
   b. operating the tube conveyor system at an angle of at least a 30 degree incline to convey granular material.

16. The method of claim 15, wherein the operating angle is between 30 degrees and 45 degrees.

17. The method of claim 16, wherein the longitudinal distance between subsequent cleat rows is 5 inches.

18. The method of claim 17, wherein the operating angle is between a 40 degree and 45 degree incline.

* * * * *